Jan. 3, 1956 A. C. HILLMAN 2,728,965
CLIP FOR THE ASSEMBLY OF EVERGREEN AND/OR
FLORAL MATERIAL TO FORM DISPLAYS
Filed Dec. 10, 1952
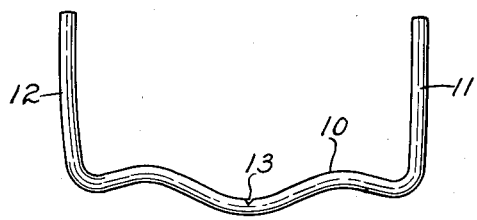
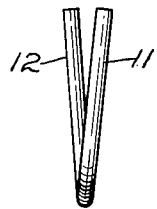
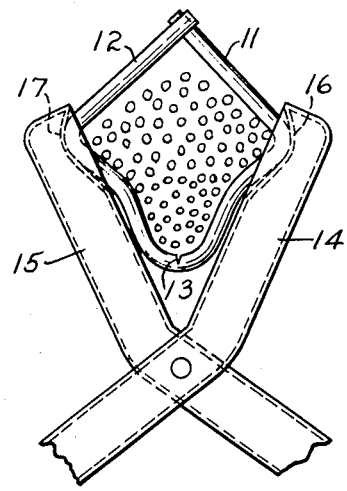
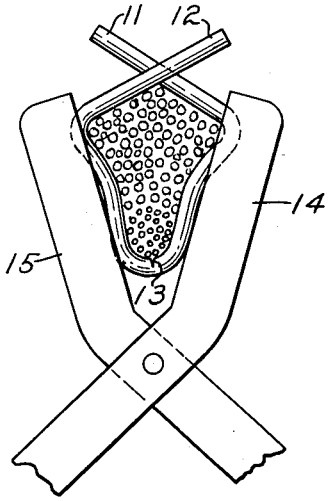
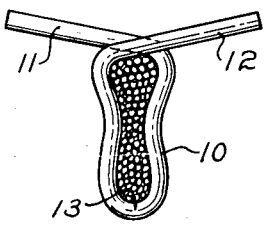
INVENTOR
ARTHUR C. HILLMAN
BY
ATTORNEY : 2,728,965
Patented Jan. 3, 1956

2,728,965

CLIP FOR THE ASSEMBLY OF EVERGREEN AND/OR FLORAL MATERIAL TO FORM DISPLAYS

Arthur C. Hillman, East Paterson, N. J.

Application December 10, 1952, Serial No. 325,117

1 Claim. (Cl. 24—27)

This invention relates to a device for use primarily in the assembly of evergreen and/or floral material to form displays. More particularly, this invention comprises a clip member which is adapted to be bent around assembled stems of flora such as flowers and evergreens, both natural and artificial, to rigidly secure the same together and to a wire or rope form or base. The clip of this invention is useful in the formation of a wide variety of displays such, for example, as long garlands and festoons, grave coverings, wreaths, crosses, hearts, anchors, and substantially all the special display forms which florists are required to produce.

Prior to the instant invention, such displays were produced entirely by hand. When the material was assembled at one point of a rope or wire form or base, it was then hand wrapped with wire or cord to secure it in place. This operation was then repeated at successive points along the form or base until the desired display was completed.

It is an object of this invention to provide a deformable clip member for this purpose which can be placed in the jaws of a simple machine which bends the said clip around the assembled flora and base member in a single, quick operation.

It is a further object of this invention to provide a clip for this purpose so designed that it will securely lock the flora to the core (wire or rope), even where there are wide variations in the amount and size of the flora to be assembled.

A complete understanding of this invention may be had from the following description in conjunction with the attached sheet of drawing, in which:

Figure 1 is a view in elevation of a preferred embodiment of this invention.

Figure 2 is an end view of the device shown in Figure 1.

Figures 3, 4, and 5 show the clip member in various stages of deformation surrounding strands of flora.

The clip member is preferably formed of metallic wire-like material which, while having some degree of resiliency, is capable of permanent deformation. As shown in Figure 1, the clip is substantially of a U-shaped configuration. The base of the U has a pair of upwardly extending bends 10, one at either side of the center. The leg portions 11 and 12 of the U, while disposed at substantially right angles to the base portion, occupy different radial positions as shown most clearly in Figure 2. That is to say, a plane which includes the base portion and one leg, does not include the other leg. At approximately the center of the base portion which is bent downwardly or in the opposite direction from the bends 10, there is provided a mechanically weakened point shown in the drawings as a notch 13.

In use, the clip member is placed in a bending machine (such as shown in copending application Serial No. 194,869, filed November 9, 1950, now abandoned) having plier-like jaws 14 and 15, the inner faces of which are grooved as shown at 16 and 17 to receive the clip member. Taking a rope or wire as a base, the machine operator will then assemble about such base a bunch of flora and place the same in the clip.

The following description of the bending of the clip member is with particular reference to a small bunch of small dimensioned flora which requires substantially complete deformation of the clip to produce the desired locking together of the flora and base. By virtue of the bent portions 10, however, wide variation in the amount and size of flora is possible. With the clip bent to the positions shown in Figures 3, 4 and 5 or any intermediate position between that shown in Figures 3 and 5, the flora will be securely locked to the base member. It will be apparent therefore, that the extent of deformation of the clip member necessary to effect locking of the flora to the base is determined entirely by the amount and size of the assembled flora and base.

Referring now to Figures 3, 4 and 5, operation of the machine causes the jaw members 14 and 15 to bend the clip member around the assembled material and base. Because of the weakened center portion at the base of the clip, initial bending takes place at this point and the clip first assumes the shape shown in Figure 3. Continued application of pressure to the jaws 14 and 15 results in further bending in the area of the notch 13 as shown in Figure 4, and ultimately the clip will assume the configuration shown in Figure 5. In the latter position, the flora are securely locked together and to the wire or rope base.

From the above it will be seen that in using the clip member of this invention, displays of substantially any configuration can be quickly and easily assembled by one person. One has only to continue to feed the rope or wire base or form together with the flora into the clip positioned in the machine and then operate the machine to bend the clip around the assembled material. Obviously, any desired length or shape can be assembled and by actual test the time of assembly of complex displays has been cut substantially in half. In addition to the saving in time, the finished product is a superior one in that the various components are more securely locked in place.

The following claim defines with particularity the scope of this invention.

I claim:

A device for use in assembling a plurality of flora into a display comprising: a wire-like clip member substantially U-shaped, the base of the U having a downwardly bent center portion and a pair of upwardly bent portions on either side of the center portion; means defining a notch substantially at the center of the downwardly bent base portion, and the legs of the U being substantially straight and extending radially from the base portion in a pair of planes each of which includes one leg and the base, said planes intersecting each other at an acute angle.

References Cited in the file of this patent

UNITED STATES PATENTS

| 926,274 | Meneray | June 29, 1909 |
| 1,192,896 | Hine | Aug. 1, 1916 |
| 1,837,478 | Paulson | Dec. 22, 1931 |
| 2,286,001 | Nichols et al. | June 9, 1942 |

FOREIGN PATENTS

| 53,503 | France | July 16, 1945 |
| | (1st addition to No. 804,035) | |
| 497,818 | Germany | May 14, 1930 |
| 181,263 | Switzerland | Apr. 16, 1936 |